US006633628B1

(12) United States Patent
Linder et al.

(10) Patent No.: US 6,633,628 B1
(45) Date of Patent: Oct. 14, 2003

(54) APPARATUS AND METHOD FOR SELECTING A SUPPORTED SIGNAL PATH FOR A TRANSCEIVER

(75) Inventors: Donald Linder, Gainesville, VA (US); Doug Adams, Franklin, MA (US); James Landry, Germantown, MD (US); Michael Giovannoni, Great Falls, VA (US)

(73) Assignee: 3Com Corporation, Santa Clara, CA (US)

( * ) Notice: Subject to any disclaimer, the term of this patent is extended or adjusted under 35 U.S.C. 154(b) by 0 days.

(21) Appl. No.: 09/755,765

(22) Filed: Jan. 5, 2001

Related U.S. Application Data

(60) Provisional application No. 60/174,870, filed on Jan. 7, 2000.

(51) Int. Cl.[7] .......................... H04M 1/24; H04M 3/08; H04M 3/22

(52) U.S. Cl. ................ 379/22.07; 379/1.04; 379/22.02; 379/22.05; 379/22.07; 379/24; 379/27.03; 379/27.06

(58) Field of Search .............................. 379/1.03, 1.04, 379/22, 22.06, 22.07, 23, 27.01, 27.06, 28, 224, 228, 219, 222, 22.02, 22.05, 24, 27.03; 370/464, 468, 248, 250, 252

(56) References Cited

U.S. PATENT DOCUMENTS

| 5,784,558 A | * | 7/1998 | Emerson et al. ......... 395/200.6 |
| 6,101,216 A | * | 8/2000 | Henderson et al. ......... 375/222 |
| 6,151,335 A | * | 11/2000 | Ko et al. ..................... 370/487 |
| 6,177,801 B1 | * | 1/2001 | Chong ........................ 324/520 |
| 6,215,855 B1 | * | 4/2001 | Schneider .................... 379/22 |
| 6,236,714 B1 | * | 5/2001 | Zheng et al. .................. 379/6 |
| 6,266,348 B1 | * | 7/2001 | Gross et al. ................ 370/493 |
| 6,272,209 B1 | * | 8/2001 | Bridger et al. ................ 379/27 |
| 6,292,468 B1 | * | 9/2001 | Sanderson .................. 370/241 |
| 6,324,167 B1 | * | 11/2001 | Starr .......................... 370/250 |
| 6,371,780 B1 | * | 4/2002 | Aponte et al. .............. 439/188 |
| 6,373,923 B1 | * | 4/2002 | Williamson et al. ..... 379/22.01 |
| 6,385,297 B2 | * | 5/2002 | Faulkner et al. ........... 379/1.04 |
| 6,396,837 B1 | * | 5/2002 | Wang et al. ........... 370/395.21 |
| 6,404,774 B1 | * | 6/2002 | Jenness ....................... 370/465 |
| 6,477,238 B1 | * | 11/2002 | Schneider et al. ....... 379/22.04 |

OTHER PUBLICATIONS

International Telecommunications Union (ITU)—Telecommunication Standardization Sector, Study Group 15, Temporary Document RB–022–E, "Splitterless G.Lite Interoperability with ANSI T1.413 and/or G.DMT", Redbank, NJ Oct. 27–29, 1997.
ADSL Forum TR–001, "Asymmetric Digital Subscriber Line Forum", May 1996, pp. 1–7.
"G–Lite: Making the Internet Fast Enough for Consumers", Aware, Inc., 40 Middlesex Turnpike,Bedford, MA 01730, 1999, pp. 1–8.
Asymmetric Digital Subscriber Line Forum Technical Report TR–007, "Interfaces and system Configurations for ADSL: Customer Premises", Mar. 1998, pp. 1–26.
International Telecommunication Union (ITU–T), Draft G.992.1 (ex:G.dmt), "Asymmetrical Digital Subscriber Line (ADSL) Transceivers", 1999. pp. 1–238.
International Telecommunications Union (ITU–T), Draft G.992.2, Splitterless Asymmetrical Digital Subscriber Line (ADSL) Transceivers, 1999. pp. 1–152.

* cited by examiner

*Primary Examiner*—Binh Tieu
(74) *Attorney, Agent, or Firm*—McDonnell Boehnen Hulbert & Berghoff

(57) ABSTRACT

A method and apparatus for selecting a supported signal path for a transceiver in a communication system is provided. An exemplary embodiment of the apparatus includes a relay for selecting a first test signal path from a first signal path and a second signal path. A signal detector coupled to the relay may be used to determine whether a specified signal type is present on the first test signal path. A relay controller causes the relay to select a second test signal path from the first signal path and the second signal path in response to the signal detector determining that the specified signal type is not present on the first test signal path.

28 Claims, 5 Drawing Sheets

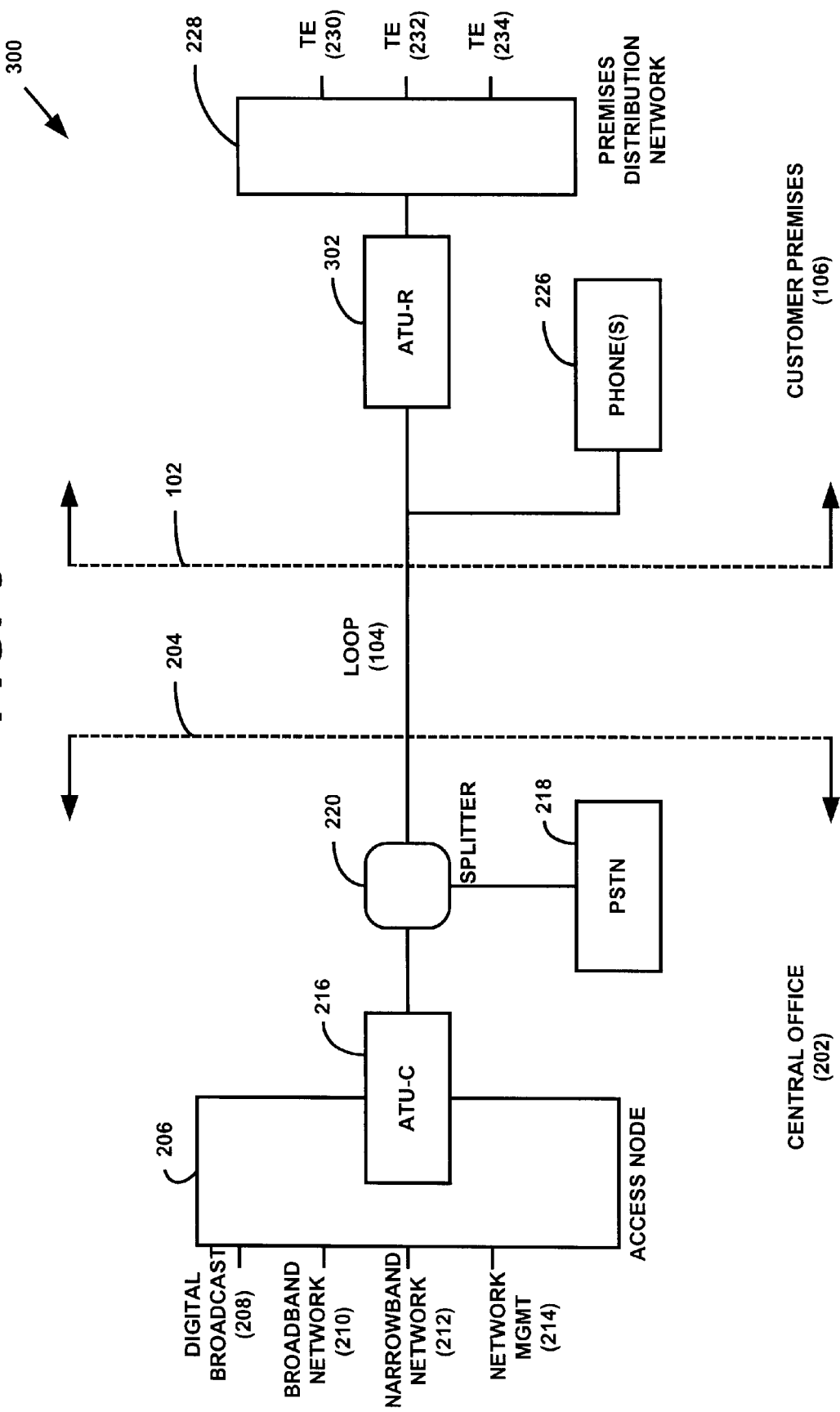

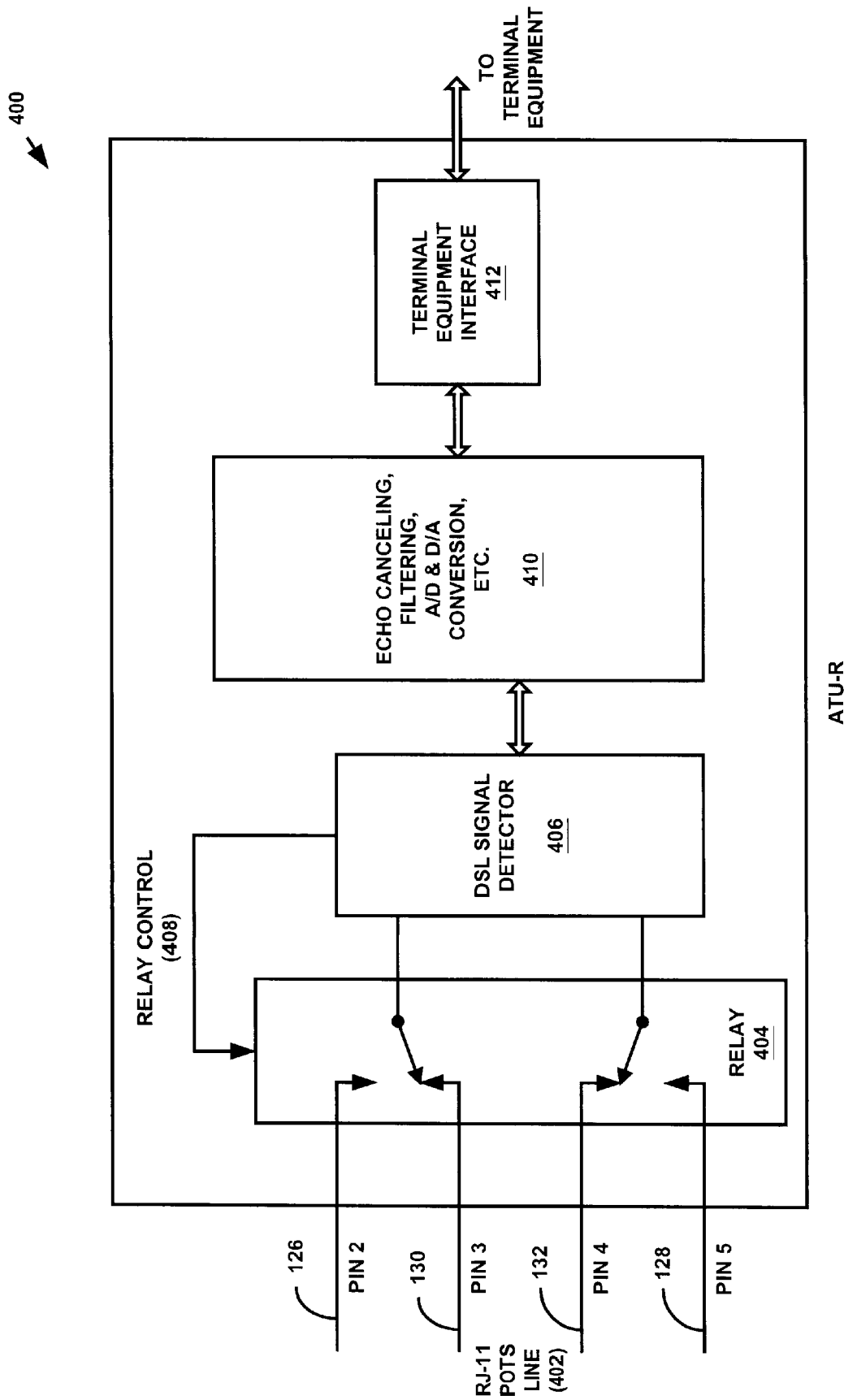

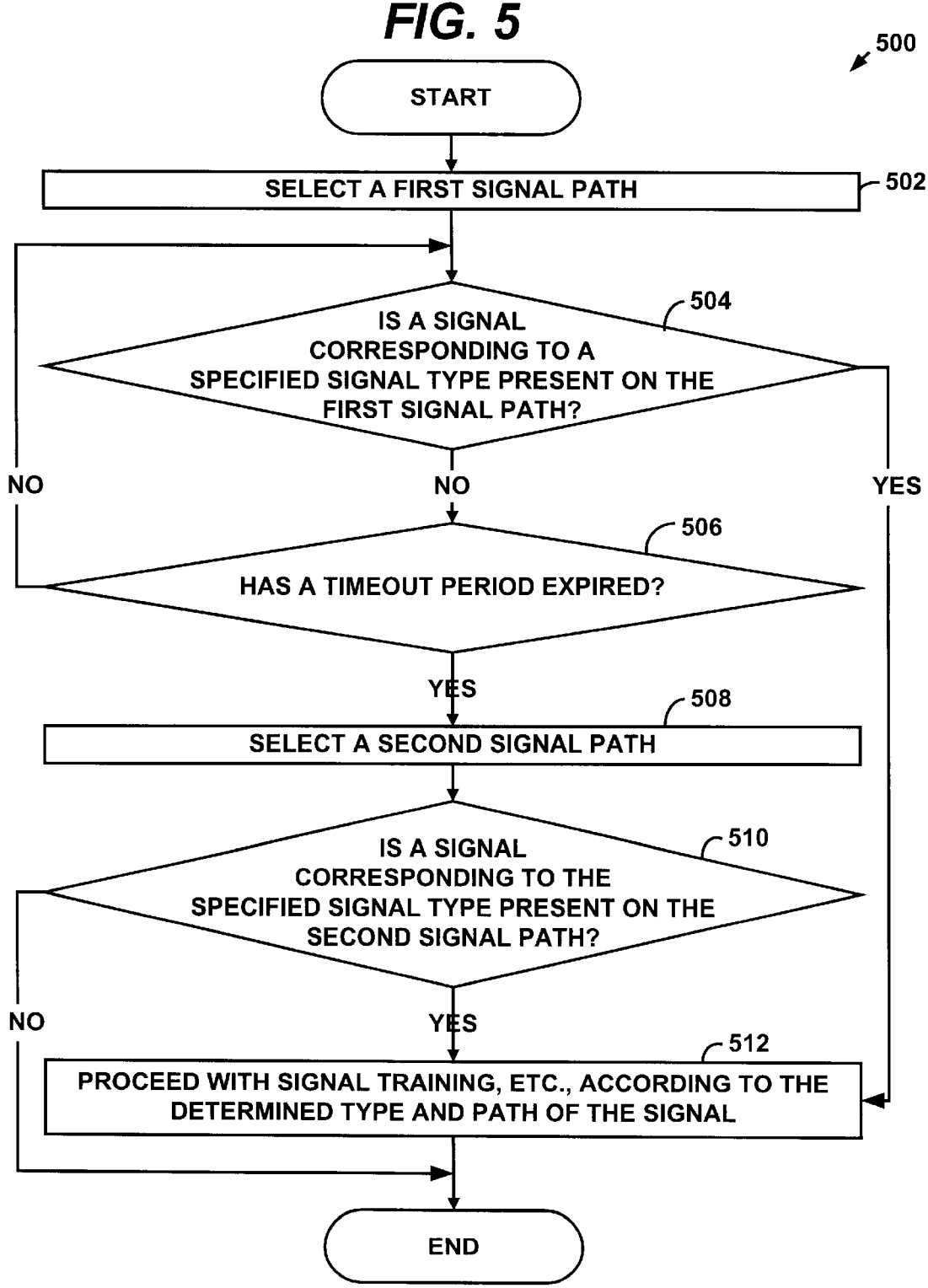

APPARATUS AND METHOD FOR SELECTING A SUPPORTED SIGNAL PATH FOR A TRANSCEIVER

CROSS REFERENCES TO RELATED APPLICATIONS

The present application claims priority to and incorporates by reference U.S. Provisional Patent Application Serial No. 60/174,870, filed Jan 7, 2000.

BACKGROUND OF THE INVENTION

A. Field of the Invention

The present invention is related to transceivers in communication systems. In particular, the present invention relates to an apparatus and method for selecting a supported signal path for a transceiver in a communication system.

B. Description of the Related Art

Most modem telephone customer locations typically have four wires coming into the customer premise location from the central office of a telephone company.

FIG. 1 is a block diagram showing an exemplary signal path configuration between a central office and a customer premise location, such as a person's home. The customer premises boundary 102 is the demarcation point between a loop 104 to a central office, and a customer premise location 106. The loop 104 typically consists of at least one pair of wires to facilitate data transmission, such as an analog telephone communication. Other services such as ISDN (Integrated Services Digital Network), or high speed network access, may also be provided.

Two pairs are shown in FIG. 1: a first pair 108, 110 is providing high speed service, and a second pair 112, 114 is providing low speed service. The two pairs 108, 110 and 112, 114 are connected to the customer premise location 106, where they may be used to distribute communication services throughout the customer premise location 106.

In FIG. 1, only one distribution path is shown and is terminated at an RJ-11 jack 116. The high speed service pair 108, 110 is shown as being connected to the outer pair 118, 120 in the customer premise location 106. The low speed service pair 112, 114 is shown as being connected to the inner pair 122, 124 at the customer premise location 106. The outer pair tip wire 118 is shown as connected to the second pin 126 of the RJ-11 jack 116, and the outer pair ring wire 120 is shown as connected to the fifth pin 128 of the RJ-11 jack 116. The inner pair tip wire 122 is shown as connected to the third pin 130 of the RJ-11 jack 116, and the inner pair ring wire 124 is shown as connected to the fourth pin 132 of the RJ-11 jack 116. The inner pair of wires 122, 124 located on the third and fourth pins 130, 132 in the RJ-11 jack 116 are usually used for low speed services, such as standard telephone service. The outer pair 118, 120 located on the second and fifth pins 126, 128 of the RJ-11 jack 116 have typically been used for higher speed services, such as ISDN. The first and sixth pairs 134, 136 of the RJ-11 jack 116 are not used. Some communication systems may utilize the first and sixth pins 134, 136, such as if a third pair is used to provide additional or supplemental communication services. Other distribution systems and other types of jacks are often commonly used. In the present invention, it may be implemented in many of these configurations as well.

Although the configuration shown in FIG. 1 has been the standard and desired implementation, in reality there has been much variation due to, for example, to installer error (or inconsistency) and customer modification to equipment. As a result, it has been difficult to design equipment that relies on a standard mapping of services to pin configurations.

Needed is an apparatus and method that is able to sense the configuration of customer premises' wiring, and that can, accordingly, adapt to the sensed configuration, enabling a device, such as a transceiver, to utilize the proper wires for the services being offered.

Also needed is a digital subscriber line transceiver that is able to automatically determine the type of DSL service being provided and the signal path over which the service is being provided.

BRIEF DESCRIPTION OF THE DRAWINGS

Presently preferred embodiments of the invention are described below in conjunction with the appended drawing figures, wherein like reference numerals refer to like elements in the various figures, and wherein:

FIG. 3 is a block diagram of an exemplary ADSL system in which no splitter is used at the customer premise location;

FIG. 4 is a block diagram showing a transceiver according to a preferred embodiment of the present invention; and FIG. 5 is flow diagram showing a method for selecting a supported signal path for a transceiver according to an embodiment of the present invention.

DETAILED DESCRIPTION OF THE PREFERRED EMBODIMENT

Figure 1:
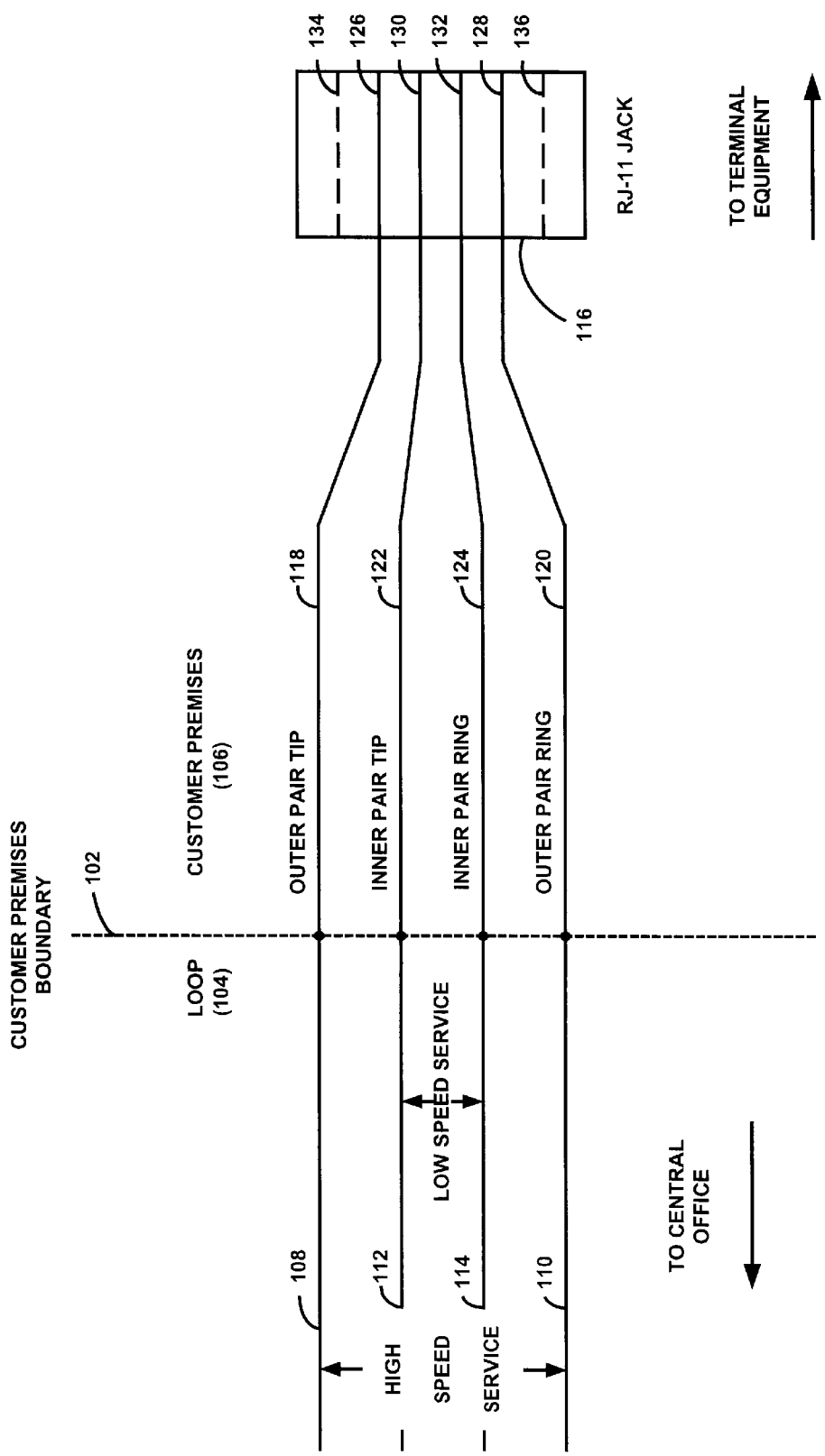
FIG. 1 is a block diagram showing an exemplary signal path configuration from a central office of a telephone company to terminal equipment located at a customer premise location.
Figure 2:
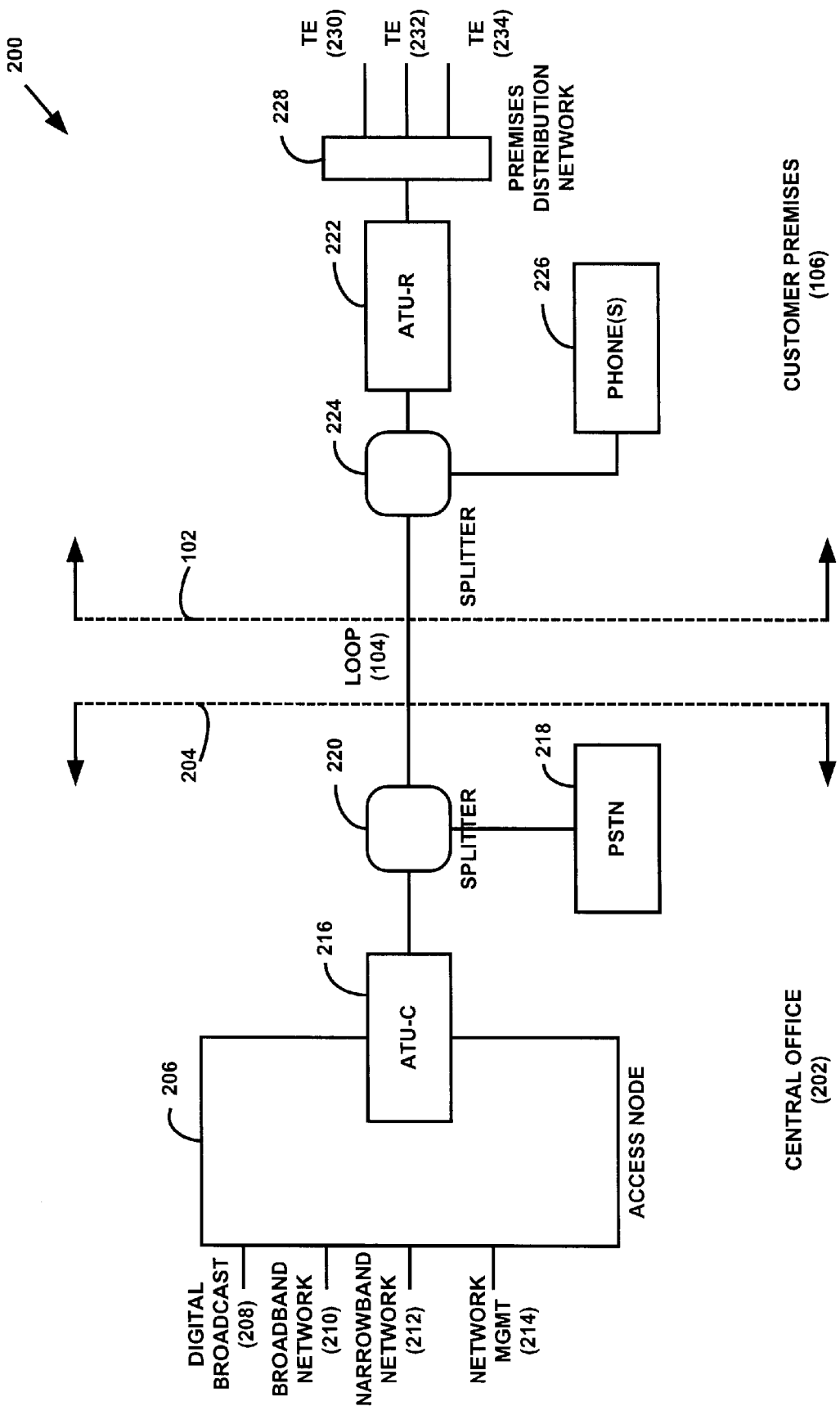
FIG. 2 is a block diagram showing an exemplary ADSL system in which a splitter is used at the customer premise location.

FIG. 2 is a block diagram showing an exemplary ADSL system 200 between a central office 202 and a customer premise location 106. The central office 202 is connected to the customer premise location 106 through the loop 104. The customer premises boundary 102 and a central office boundary 204 serve as the demarcation points of the customer premise location 106 and the central office 202. The loop 104 is typically maintained by the same entity as the central office 202.

At the central office 202, an access node 206 provides data connectivity to one or more network services. The access node 206 is shown having a digital broadcast link 208, a broad band network link 210, a narrow band network link 212, and a network management link 214. The access node 206 may be connected, for example, to the public Internet. The access node 206 is connected to an ATU-C 216 (ADSL Terminal Unit-Central Office). The ATU-C 216 may be a modem at the central office, for example.

The central office 202 is also likely to provide POTS service. A connection to the PSTN 218 (Public Switched Telephone Network) allows the central office to provide customers with telephone service. A central office splitter 220 may be located at the point where ADSL signals from the ATU-C 216 and POTS signals from the PSTN 218 come together for transmission across the loop 104 to the customer premise location 106.

At the customer premise location 106, the ADSL and POTS signal from the central office 202 are received across the customer premises boundary 102 by a customer premise splitter 224. The customer premise splitter 224 uses filters to separate the POTS signal from the ADSL signal. The POTS signal is distributed to one or more telephones 226. The ADSL signal is distributed to an ATU-R 222 (ADSL Terminal Unit-Residential). The ATU-R 222 converts the ADSL signals to terminal equipment data for distribution to terminal equipment 230, 232, 234 through a premises distribution network 228.

The system 200 is representative of what might be implemented in a full-rate ADSL configuration. The ANSI T1.413 Specification and the ITU-T Recommendation G.992.1 (1999) describe full-rate ADSL systems in which a splitter, such as the splitter 224, is used.

FIG. 3 is a block diagram showing an exemplary ADSL system 300 in which no splitter is used at the customer premise location 106. Such a system may be used in non-full-rate ADSL services. For example, the G-Lite form of digital subscriber line, describes such a form of DSL. In a G-Lite system, no splitter is needed at the customer premise location 106 because the ADSL signals are transmitted at a lower transmission rate and, therefore, are not as likely to interfere with the POTS signals used for voice telephone on the telephones 226. A G-Lite ATU-R 302 transceiver is shown at the customer premise location 106. With the exception of the ATU-R 302 and the lack of the customer premise location's splitter 224, system 300 may be nearly identical to system 200.

FIG. 4 is a block diagram showing a transceiver 400 according to a preferred embodiment of the present invention. The transceiver 400 includes an interface to a communication line, such as a RJ-11 POTS line 402 having second through fifth pins 126, 130, 132, 128. The POTS line interface connects the transceiver 400 to the POTS line 402, which is connected to the digital subscriber line service provider, which may be a central office of a telephone service provider. The interface to the RJ-11 POTS line 402 is coupled to a relay 404 that is operable to select signal paths, including test signal paths, from between pairs of the POTS line 402. A digital subscriber line signal detector 406 is coupled to the relays 404 for determining whether a digital subscriber line signal type is present on the signal path selected (such as a first test signal path) by the relay 404. This determination is made by initiating a training procedure on a detected signal. Training is known by those having skill in the relevant art. If the link fails to train at all, or if the link will train but at a lower rate than expected, then the digital subscriber line detector 406 determines that the appropriate signal (such as a digital subscriber line signal) is not present on the selected signal path. A relay controller 408 is coupled between the digital subscriber line signal detector 406 and the relay 404, and is operable to cause the relay to select an alternate signal path (such as a second signal path) if an appropriate signal is not detected by the signal detector 406. The relay 404, the signal detector 406, and the relay controller 408 comprise an apparatus for selecting a supported signal path for the transceiver 400.

In one embodiment, the signal detector repeatedly tests to determine whether the specified signal type is present until a timeout period has expired. the timeout period may be a factory specified duration of time, or it may be user-controlled, for example.

The transceiver 400 is also likely to contain additional circuitry, such as echo canceling, filtering, analog to digital and digital to analog conversion and other circuitry, which is shown generally as signal conversion means 410. The signal conversion means 410 is coupled to the apparatus comprising the relay 404, the DSL signal detector 406, and the relay controller 408. In FIG. 4, the connection is shown between the signal detector 406 and the signal conversion means 410. Alternative connection schemes are also possible, such as a connection from the relay 404 to the signal conversion means 410. A terminal equipment interface 412 couples the transceiver 400 to terminal equipment, such as one or more personal computers, network appliances, or other terminal equipment. The terminal equipment 412 is preferably coupled to the signal conversion means 410, and is operable to transmit and receive terminal equipment data.

In the preferred embodiment, the first signal path is an outer pair of an RJ-11 line, the second signal path (the alternate signal path) is an inner pair of the RJ-11 line, and the RJ-11 line is a POTS line having a connection to a central office transceiver.

FIG. 5 is a flow diagram showing a method 500 for selecting a supported signal path for a transceiver according to an embodiment of the present invention. In step 502, a first signal path is selected (a "first test signal path"). In step 504, the first signal path is examined to determine whether a signal corresponding to a specified signal type is present on the first signal path. This determination is made by initiating a training procedure on a detected signal. Training is known by those having skill in the relevant art. If the link fails to train at all, or if the link will train but at a lower rate than expected, then the digital subscriber line detector 406 determines that the appropriate signal (such as a digital subscriber line signal) is not present on the selected signal path. If it is determined that the specified signal type is present on the first signal path, then the transceiver may proceed with signal training and other tasks associated with initiating data transmission, as shown in step 512. If, in step 504, it is determined that the specified signal type is not present on the first signal path, then a determination is made as to whether a time out period has expired, as shown in step 506. If the time out period has not expired, then step 504 is repeated, and the first signal path is again examined to determine whether a signal corresponding to the specified signal type is present on the first signal path. If, in step 506, it is determined that the time out period has expired, then a second signal path is selected (a "second test signal path"), as shown in step 508. In step 510, it is determined whether a signal corresponding to the specified signal type is present on the second signal path. If the signal corresponding to the specified signal type is present on the second signal path, then signal training is undertaken, as shown in step 512. If the signal corresponding to the specified signal type is not present on the second signal path, then the method may either conclude, or may repeat step 510 for a time out period, for example.

While the invention has been described in conjunction with presently preferred embodiments of the invention, persons of skill in the art will appreciate that variations may be made without departure from the scope and spirit of the invention.

In addition, protocols of various types are referenced throughout. While preferred and alternative embodiments may implement selected protocols, any suitable replacement protocol not mentioned, or any function not part of a protocol used to replace a corresponding function from a protocol may be implemented without departing from the scope of the invention.

This true scope and spirit is defined by the appended claims, interpreted in light of the foregoing.

We claim:

1. An apparatus for selecting a supported signal path for a transceiver in a communication system, comprising, in combination:

a relay operable to select at least one test signal path from a plurality of signal paths, wherein the plurality of signal paths includes at least a first signal path and a second signal path;

a signal detector coupled to the relay for determining whether the at least one test signal path is the supported signal path, wherein the first signal path is the supported signal path when the signal detector determines that a specified signal type is present on the first signal path, and wherein the second signal path is the supported signal path when the signal detector determines that the specified signal type is present on the second signal path; and a relay controller operable to cause the relay to select the first signal path to allow the signal detector to determine whether the first signal path is the supported signal path, and to select the second signal path when the signal detector determines that the first signal path is not the supported signal path to allow the signal detector to determine whether the second signal path is the supported signal path.

2. The system of claim 1, wherein the communication system is a twisted pair communication system.

3. The system of claim 1, wherein the transceiver is a digital subscriber line transceiver located at customer premises.

4. The system of claim 1, wherein the transceiver is an asymmetric digital subscriber line transceiver conforming to the ITU G.992.1 specification.

5. The system of claim 1, wherein the transceiver is an asymmetric digital subscriber line transceiver conforming to the ITU G.992.2 specification.

6. The apparatus of claim 1, wherein the apparatus is comprised within the transceiver.

7. The apparatus of claim 3, wherein the relay is operable to select one of at least an outer pair and an inner pair of an RJ-11 line, and wherein the selected pair is in communication with a second transceiver.

8. The apparatus of claim 7, wherein the second transceiver is a central office digital subscriber line transceiver.

9. The apparatus of claim 1, wherein the relay couples the first signal path to the transceiver when the signal detector determines that the first signal path is the support signal path.

10. The apparatus of claim 1, wherein the relay couples the second signal path to the transceiver when the signal detector determines that the second test signal path is the supported signal path.

11. The apparatus of claim 1, wherein the signal detector repeatedly tests to determine whether the specified signal type is present until a timeout period has expired.

12. The apparatus of claim 1, wherein the first signal path is an outer pair of an RJ-11 line, the second signal path is an inner pair of the RJ-11 line, and the RJ-11 line is a POTS line having a connection to a central office transceiver.

13. A method for selecting a supported signal path for a transceiver in a communication system, comprising, in combination:

connecting to a common signal path at least one signal path selected from a plurality of switchable signal paths to determine whether the at least one signal path is a supported signal path, wherein the plurality of switchable signal paths includes at least a first signal path and a second signal path;

determining whether the at least one signal path is the supported signal path, wherein the first signal path is the supported signal path when a specified signal type is present on the first signal path, and wherein the second signal path is the supported signal path when the specified signal type is present on the second signal path;

selecting the first signal path when the first signal path is the supported signal path; and selecting the second signal path when the second signal path is the supported signal path.

14. The method of claim 13, wherein the communication system is a twisted pair communication system.

15. The method of claim 13, wherein the transceiver is a digital subscriber line transceiver located at customer premises.

16. The method of claim 13, wherein the transceiver is an asymmetric digital subscriber line transceiver conforming to the ITU G.992.1 specification.

17. The method of claim 13, wherein the transceiver is an asymmetric digital subscriber line transceiver conforming to the ITU G.992.2 specification.

18. The method of claim 13, wherein the first signal path is an outer pair of an RJ-11 line, the second signal path is an inner pair of the RJ-11 line, and the RJ-11 line is a POTS line having a connection to a second transceiver.

19. The method of claim 18, wherein the second transceiver is a central office digital subscriber line transceiver.

20. The method of claim 13, wherein the first signal path is coupled to the transceiver when determining that the first signal path is the supported signal path.

21. The method of claim 13, wherein the determining step comprises repeatedly testing the first signal path to determine whether the specified signal type is present until a timeout period has expired.

22. The method of claim 13, wherein the determining step comprises repeatedly testing the second signal path to determine whether the specified signal type is present until a timeout period has expired.

23. A digital subscriber line transceiver having supported signal path sensing capabilities, comprising, in combination:

a POTS line interface for connecting the transceiver to a POTS line, the POTS line connected to a digital subscriber line service provider;

a relay coupled to the POTS line interface, operable to select at least one test signal path from a plurality of pairs of the POTS line, wherein the plurality of pairs of the POTS line includes at least a first pair and a second pair;

a digital subscriber line signal detector coupled to the relay for determining whether the at least one test signal path is a supported signal path, wherein the first pair is the supported signal path when a digital subscriber line signal type is present on the first pair, and wherein the second pair is the supported signal path when the digital subscriber line signal type is present on the second pair;

a relay controller operable to cause the relay to select at least one test signal path from the plurality of pairs of the POTS line, wherein the relay controller is operable to select the second pair when the signal detector determines that the digital subscriber line signal type is not present on the first pair;

signal conversion means for converting digital subscriber line signals received across the supported signal path into terminal equipment data and for converting terminal equipment data into digital subscriber line signals for transmission across the supported signal path; and a terminal equipment interface coupled to the signal conversion means providing a connection to terminal equipment, wherein the terminal equipment is operable to transmit and receive terminal equipment data.

24. The transceiver of claim 23, wherein the digital subscriber line signal type conforms to the ITU G.992.1 specification.

25. The transceiver of claim 23, wherein the digital subscriber line signal type conforms To the ITU G.992.2 specification.

26. The transceiver of claim 23, wherein the POTS line interface is an RJ-11 POTS line connector, and wherein the POTS line is an RJ-11 POTS line.

27. The transceiver of claim 26, wherein the first pair is an outer pair of the RJ-11 POTS line and the second pair is an inner pair of the RJ-11 POTS line.

28. The transceiver of claim 23, wherein the signal conversion means comprises an echo canceller, a filter, an analog-to-digital converter, a digital-to-analog converter, a coder, and a decoder.

* * * * *